Aug. 13, 1929.     H. O. STORMS     1,724,530
WIPER ARM FOR WINDSHIELD CLEANERS
Filed April 2, 1928

Inventor
H. O. Storms

By Clarence A. O'Brien
Attorney

Patented Aug. 13, 1929.

1,724,530

UNITED STATES PATENT OFFICE.

HAROLD O. STORMS, OF SPRING GREEN, WISCONSIN, ASSIGNOR OF ONE-HALF TO H. R. MADSEN AND H. A. HOVELSRUD, COPARTNERS AS MADSEN & HOVELSRUD.

WIPER ARM FOR WINDSHIELD CLEANERS.

Application filed April 2, 1928. Serial No. 266,627.

This invention relates to new and useful improvements in windshield cleaner wiper arms that aim to provide an arm construction for use in conjunction with the manually or automatically controlled windshield wipers, the invention aiming to provide a wiper arm having a heating element extending throughout substantially the entire length thereof and intermediate the sides thereof so that the movement of the arm will cause the distribution of the heat across the surface of the windshield encountered by the wiper to prevent the freezing of snow or rain upon the windshield which prevents the wiper from operating and obviously impairs the vision of the driver making it frequently necessary for the driver to scrape the ice from the windshield before it is possible to proceed.

An important object of the invention is to provide a wiper arm of this general character that is extremely simple in construction and relatively inexpensive of manufacture, the same comprising but few parts in addition to those types of wiper arms now in use.

With the foregoing and other objects in view as the nature of the invention will be better understood the same comprises the novel form, combination and arrangement of parts will be hereinafter more fully described and claimed.

In the accompanying drawings wherein like reference characters indicate corresponding parts throughout the several views.

Figure 1:
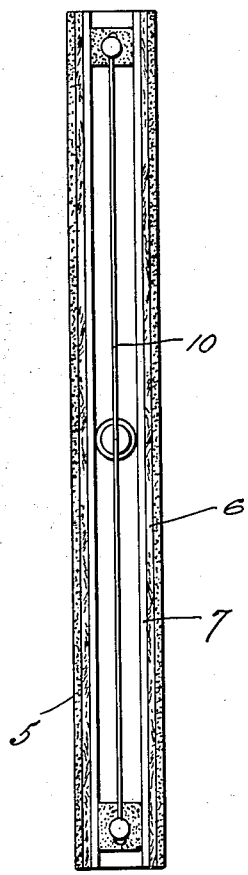
Figure 1 is an elevation of the wiping side of the arm.

Now having particular reference to the drawing, my novel wiper arm consists of a channel member 5, preferably of rubber and of predetermined dimension, the forward edges of the side walls of the channel member providing a pair of wiping edges for engagement with the outer surface of the windshield. Arranged within the channel member and spaced therefrom by a lining of asbestos or the like 6 is a metallic channel reinforcing member 7, the side walls of which terminate inwardly of the side walls of the wiping channel member 5 so that the metal will not come into engagement with the glass surface.

Figure 2:
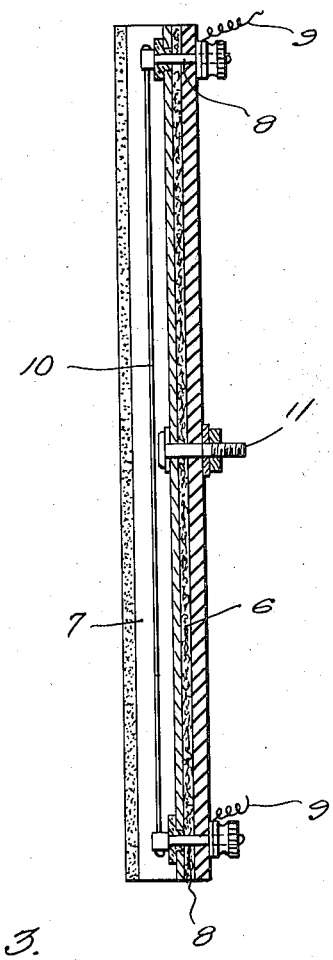
Figure 2 is a detail longitudinal section thereof.
Figure 3:
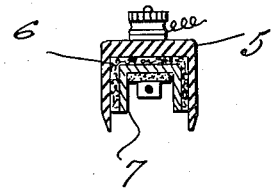
Figure 3 is a transverse section.

Extending through the channel members adjacent the upper and lower ends thereof are pins 8—8, the outer ends of which are constructed and equipped to permit of the attachment of current conducting wires 9—9 thereto. These pins 8 are insulated from the metallic channel member 7 as clearly disclosed in Figures 1 and 2. Arranged between the inner ends of these pins is an uninsulated conducting wire 10 that will become highly heated when the current passes therethrough so that this heat flowing toward the windshield will in turn heat the windshield to prevent the accumulation of ice thereon.

Extending through the center of the wiper arm thus constructed is a pivot pin 11 to facilitate the attachment of the wiper arm to the usual windshield wiper structure be it the mechanical or automatic variety.

It will thus be seen that I have provided a highly novel, simple and extremely useful wiper arm for windshield cleaners that is well adapted for all the purposes heretofore designated, even though I have herein shown and described this invention as consisting of certain detail structural elements it is nevertheless to be understood that some changes may be made therein without affecting the spirit and scope of the appended claim.

Having thus described the invention, what I claim as new is:—

In a wiper arm for windshield wipers, an elongated rubber U-shaped outer member, the edges of the side walls of which provide a pair of wiping strips, a metallic U-shaped reinforcing member arranged within the rubber U-shaped outer member, the edges of the side walls of the inner member terminating inwardly of the edges of the side walls of the outer U-shaped member, a lining of heat insulating material interposed between said U-shaped members, upper and lower terminals extending through the crown portions of said U-shaped members, said terminals being insulated from the metallic inner U-shaped member, a heating wire connected at its respective ends to the inner ends of the terminals for disposition within the inner U-shaped member and being spaced therefrom, and an attaching pin carried by the intermediate portion of the outer U-shaped member.

In testimony whereof I affix my signature.

HAROLD OLE STORMS.